(12) United States Patent
Aso

(10) Patent No.: US 10,166,861 B2
(45) Date of Patent: Jan. 1, 2019

(54) FUEL TANK STRUCTURE

(71) Applicant: TOYOTA JIDOSHA KABUSHIKI KAISHA, Toyota-shi, Aichi-ken (JP)

(72) Inventor: Shuichi Aso, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

(21) Appl. No.: 15/154,491

(22) Filed: May 13, 2016

(65) Prior Publication Data
US 2016/0369757 A1    Dec. 22, 2016

(30) Foreign Application Priority Data
Jun. 19, 2015  (JP) .................................. 2015-123765

(51) Int. Cl.
F02M 37/00  (2006.01)
B60K 15/03  (2006.01)
F02M 37/10  (2006.01)
B60K 15/077  (2006.01)

(52) U.S. Cl.
CPC ...... B60K 15/03 (2013.01); B60K 2015/0775 (2013.01); F02M 37/10 (2013.01); F02M 37/106 (2013.01)

(58) Field of Classification Search
CPC ............ B60K 15/03; B60K 2015/0775; F02M 37/10; F02M 37/106

USPC ........................................ 137/461; 222/386.5
See application file for complete search history.

(56) References Cited

U.S. PATENT DOCUMENTS 3,701,540 A * 10/1972 Pringle ................ B60K 15/067
                                                       280/834
5,596,971 A    1/1997 Kidokoro
5,925,817 A *  7/1999 Kidokoro ............... B60K 15/03
                                                       73/40
5,975,331 A   11/1999 Ishikawa
6,021,978 A *  2/2000 Goss ...................... B64D 37/32
                                                       244/129.2

FOREIGN PATENT DOCUMENTS

JP  H08-170568 A  7/1996
JP  H10-184477 A  7/1998
JP  2004-019507 A  1/2004

* cited by examiner

Primary Examiner — P. Macade Nichols
(74) Attorney, Agent, or Firm — Oliff PLC

(57) ABSTRACT

A fuel tank structure including: a fuel tank that is mounted to an automobile and that stores fuel; a bat shaped member that is fixed to a ceiling portion inside the fuel tank, and that maintains a contact state with the fuel by expanding or contracting according to a fluid surface height of file stored inside the fuel tank; a pump housing recessed portion that is formed to a bottom portion of the fuel tank with a fuel pump disposed therein; and a fuel flow path that is in communication with the pump housing messed portion and that extends from the pump housing recessed portion in a groove shape.

2 Claims, 5 Drawing Sheets

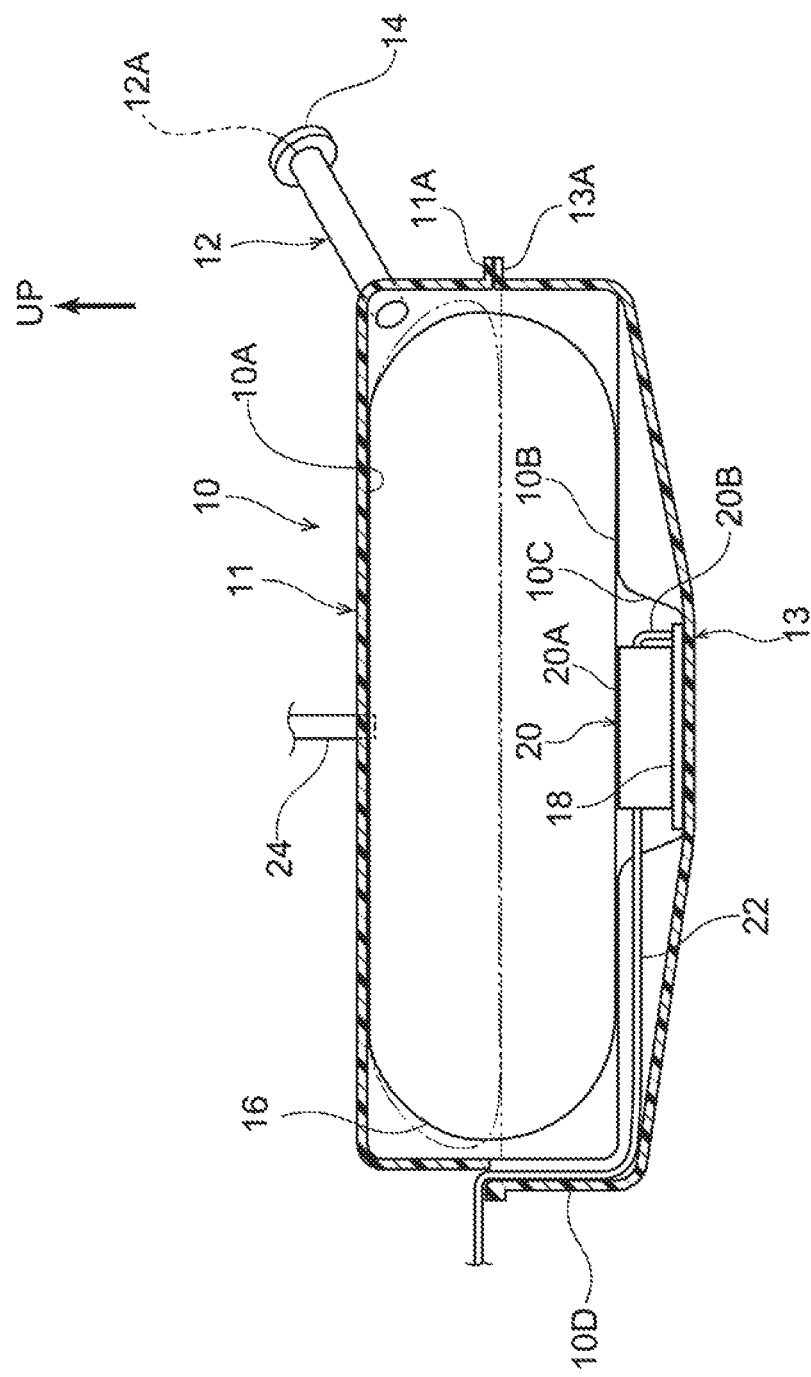

FUEL TANK STRUCTURE

CROSS-REFERENCE TO RELATED APPLICATION

This application is based on and claims priority under 35 USC 119 from Japanese Patent Application No. 2015-123765 filed on Jun. 19, 2015, the disclosure of which is incorporated by reference herein.

BACKGROUND

Technical Field

The present invention relates to a fuel tank structure.

Related Art

Japanese Patent Application Laid-Open (JP-A) No. H08-170568 describes, as a fuel tank structure mounted in a vehicle, a fuel tank structure provided with a bag shaped extending/contracting film (a bag shaped member) that is capable of expanding and contracting inside a fuel tank. A fuel pump is disposed inside a filler pipe, thereby preventing interference between the fuel pump and the extending/contracting film.

However, in the fuel tank structure described in JP-A No. H08-170568, since the fuel pump is disposed inside the filler pipe, there is a possibility that the fuel pump hinders fuel from flowing through the filler pipe during refueling or the like, and that the fuel injection efficiency is reduced. Moreover, in cases in which there is a small amount of fuel inside the fuel tank and the bag shaped member is in contact with a bottom portion of the fuel tank, some of the fuel is sometimes partitioned off by the bag shaped member. There is accordingly room fur improvement from the perspective of securing supply performance in which fuel is smoothly supplied to the fuel pump.

SUMMARY

In consideration of the above circumstances, an object of the present invention is to obtain a fuel tank structure capable of securing fuel injection performance and supply performance, while suppressing the occurrence of vaporized fuel.

A fuel tank structure of a first aspect of the present invention includes: a fuel tank that is mounted to an automobile and that stores fuel; a bag shaped member that is fixed to a ceiling portion inside the fuel tank, and that maintains a contact state with the fuel by expanding or contracting according to a fluid surface height of fuel stored inside the fuel tank; a pump housing recessed portion that is formed to a bottom portion of the fuel tank with a fuel pump disposed therein; and a fuel flow path that is in communication with the pump housing recessed portion and that extends from the pump housing recessed portion in a groove shape.

In the fuel tank structure of the first aspect of the present invention, the bag shaped member is fixed to the ceiling portion inside the fuel tank. The bag shaped member maintains the contact state with the fuel by expanding or contracting according to the fluid surface height of the fuel. This enables the fluid surface of the fuel to be covered by bag shaped member, regardless of the fluid surface height of the fuel. Namely, the occurrence of vaporized fuel can be suppressed.

The pump housing recessed portion is formed to the bottom portion of the fuel tank, and the fuel pump is disposed in the pump housing recessed portion. Thus, the fuel pump does not need to be disposed inside a filler pipe, thereby enabling fuel to be smoothly injected into the fuel tank through the filler pipe. Namely, a reduction in fuel injection efficiency can be suppressed.

Since the fuel flow path extends from the pump housing recessed portion in a groove shape, fuel flows through the fuel flow path into the pump housing recessed portion and is supplied, to the fuel pump even in a state in which the bag shaped member has expanded and is in contact with the bottom portion of the fuel tank, thereby enabling fuel supply performance to be secured.

A fuel tank structure of a second aspect of the present invention is the first aspect. wherein the pump housing recessed portion is formed at a center portion of the fuel tank in plan view, and the fuel flow path is formed in a radiating shape running from the pump housing recessed portion toward a side wall of the fuel tank.

In the fuel tank structure of the second aspect of the present invention, the fuel flow path is formed in a radiating shape toward the side wall of the fuel tank. This enables fuel to flow smoothly to the pump housing recessed portion through the fuel flow path, even in cases in which there is a small amount of fuel inside the fuel tank.

A fuel tank structure of a third aspect of the present invention is the first aspect or the second aspect, wherein the fuel flow path is sloped in a direction away from the ceiling portion on progression from a side wall of the fuel tank toward the pump housing recessed portion.

The fuel tank structure of the third aspect of the present invention enables fuel inside the fuel flow path to be more effectively collected in the pump housing recessed portion than in a configuration in which the fuel flow path is not sloped.

A fuel tank structure of a fourth aspect of the present invention is any one the first aspect to the third aspect, wherein the pump housing recessed portion is formed deeper than the height of the fuel pump.

In the fuel tank structure of the fourth aspect of the present invention, the bag shaped member does not hit the fuel pump, even in a state in which the bag shaped member has expanded and is in contact with the bottom portion of the fuel tank, thereby enabling damage to the bag shaped member to be suppressed.

As explained above, the fuel tank structure of the first aspect of the present invention has excellent advantageous effects of enabling fuel injection performance and supply performance to be secured, while suppressing the occurrence of vaporized fuel.

The fuel tank structure of the second aspect and the third aspect of the present invention have an excellent advantageous effect of enabling fuel supply performance to be improved in cases in which there is a small amount of fuel inside the fuel tank.

The fuel tank structure of the fourth aspect of the present invention has an excellent advantageous effect of enabling the durability performance of the bag shaped member to be secured.

BRIEF DESCRIPTION OF THE DRAWINGS

Exemplary embodiments of the present invention will be described in detail based on the following figures, wherein:

FIG. 5 is a drawing of the fuel tank in FIG. 1, viewed from a different angle.

DETAILED DESCRIPTION

Explanation follows regarding, a fuel tank structure according to an exemplary embodiment. Note that in each of the drawings, the arrow UP indicates the upper side of a fuel tank, as appropriate. In the present exemplary embodiment, the upper side of the fuel tank is aligned with the upper side in the vehicle up-down direction.

Figure 1:
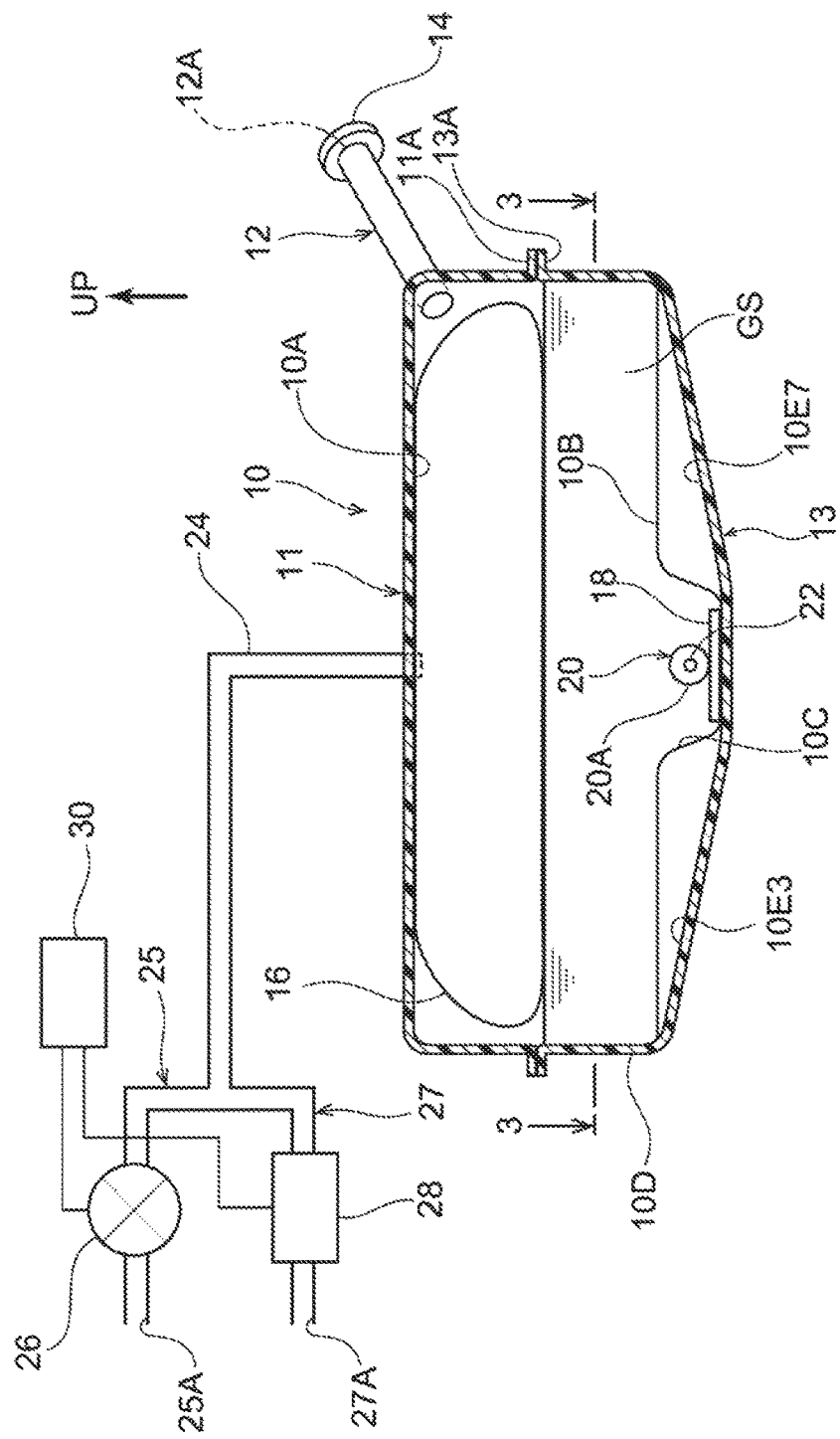
FIG. 1 is a drawing schematically illustrating a fuel tank structure according to an exemplary embodiment, and illustrates a state in which fuel is stored in approximately half of a fuel tank.

As illustrated in FIG. 1, a fuel tank 10 configuring the fuel tank structure according to the present exemplary embodiment is formed in a hollow shape, and is formed in a shape (such as a substantially rectangular box shape) capable of storing a liquid fuel (hereafter referred to as "fuel GS") inside. Specifically, the fuel tank 10 is configured including two divided (upper and lower in FIG. 1) tank configuration bodies 11, 13. The tank configuration body 11 protrudes upward, and the tank configuration body 13 protrudes downward. Flanges 11A, 13A are formed to respective outer peripheral edge portions of the two tank configuration bodies 11, 13, and the fuel tank 10 is configured in an overall box shape by joining the flange 11A and the flange 13A together. A lower face of the fuel tank 10 is supported by tank bands, not illustrated in the drawings. The tank bands are fixed to a floor panel, not illustrated in the drawings, by brackets or the like, such that the fuel tank 10 is attached to the floor panel.

A substantially tube shaped filler pipe 12 is connected to the fuel tank 10. A fuel supply port 12A is formed in an upper end portion of the filler pipe 12, and fuel is supplied by inserting a fuel supply gun into the fuel supply port 12A and injecting fuel GS into the fuel tank 10. Note that in cases in which there is a large amount of fuel GS inside the fuel tank 10, some of the fuel GS is stored in the filler pipe 12.

The fuel supply port 12A at an upper end of the filler pipe 12 is opened and closed by a fuel cap 14. A fuel lid, not illustrated in the drawings, provided to a vehicle body side panel or the like, is disposed at the outside of the fuel cap 14.

In a closed state, the fuel cap 14 closes off the fuel supply port 12A, and restricts access of a fuel supply gun into the tiller pipe 12. In contrast thereto, when the fuel cap 14 is opened, the fuel supply port 12A of the filler pipe 12 is open, and it becomes possible for a fuel supply gun to access the fuel supply path.

A bag shaped member 16 is provided at the vehicle upper side inside the fuel tank 10. The bag shaped member 16 is formed of a resin material that is capable of expanding and contracting, and is fixed to a ceiling portion 10A of the fuel tank 10. Note that "capable of expanding and contracting" referred to herein is not limited to a configuration in which the bag shaped member 16 itself expands and contracts, and includes bag shaped members with a variable volume that are contracted by being folded, or expanded by being deployed.

An inlet pipe 24, for introducing air into the bag shaped member 16, is connected to the ceiling portion IDA of the fuel tank 10. One end portion of the inlet pipe 24 enters inside the fuel tank 10, and is in communication with the space inside the bag shaped member 16.

Another end side of the inlet pipe 24 is bent, and brandies into an atmosphere opening pipe 25 and an air supply pipe 27. A pressure adjustment valve 26 is connected to the atmosphere opening pipe 25. An opening 25A that is open to the atmosphere is formed in an end portion of the atmosphere opening pipe 25.

A compressor 28 is connected to the air supply pipe 27. An opening 27A that is open to the atmosphere is formed in an end portion of the air supply pipe 27. The pressure adjustment, valve 26 and the compressor 28 are electrically connected to an Electronic Control Unit (ECU) 30, this being a controller.

Figure 2:
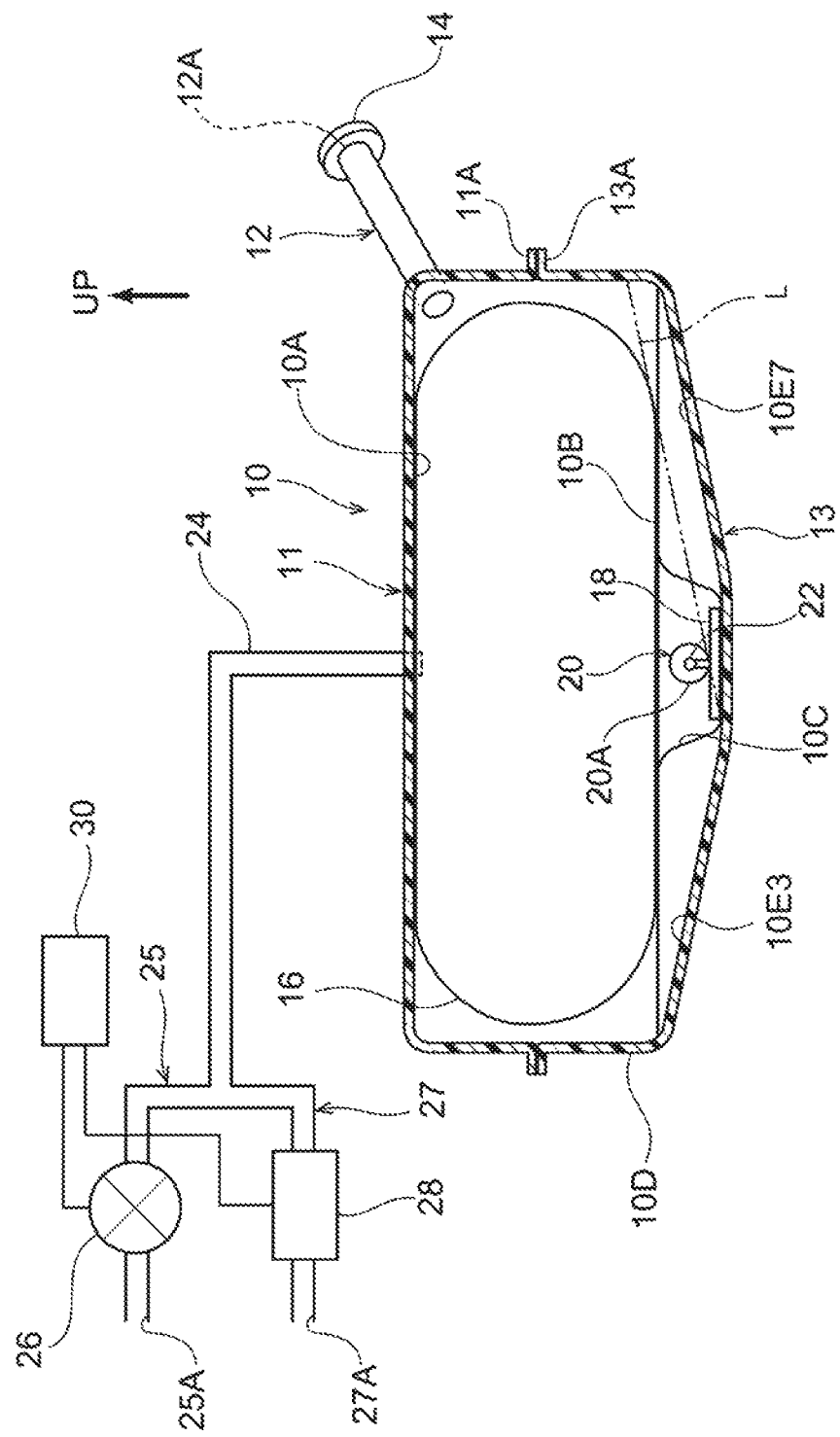
FIG. 2 is a drawing corresponding to FIG. 1, illustrating a state in which a bag shaped member is in contact with a bottom portion of the fuel tank.

Note that the ECU 30 causes the bag shaped member 16 to expand or contract according to the fluid surface height of the fuel GS stored in the fuel tank 10 by controlling the pressure adjustment valve 26 and the compressor 28. Namely, a contact state between the bag shaped member 16 and the fuel GS is maintained by the ECU 30 controlling the pressure adjustment valve 26 and the compressor 28. Specifically, as illustrated in FIG. 2, in cases in which the amount of fuel GS has decreased and the fluid surface height has fallen, the pressure adjustment valve 26 is closed, by a signal from the ECU 30. The compressor 28 is then operated, and compressed air is introduced into the bag shaped member 16 through the air supply pipe 27 and the inlet pipe 24. The bag shaped member 16 thereby expands, and the contact state between the bag shaped member 16 and the fluid surface of the fuel GS is maintained.

In cases in which the fluid surface has risen due to the amount of fuel GS increasing such as by refueling, the pressure adjustment valve 26 is opened by a signal from the ECU 30. In cases in which the compressor 28 is operating, the compressor 28 is stopped by a signal from the ECU 30. The pressure in the space inside the bag shaped member 16 thereby lowers to the atmospheric pressure. Air inside the bag shaped member 16 is accordingly pressed out through the inlet pipe 24 and discharged through the opening 25A as the fluid surface of the fuel GS rises. The contact state between the bag shaped member 16 and the fluid surface of the fuel GS is accordingly maintained.

Figure 3:
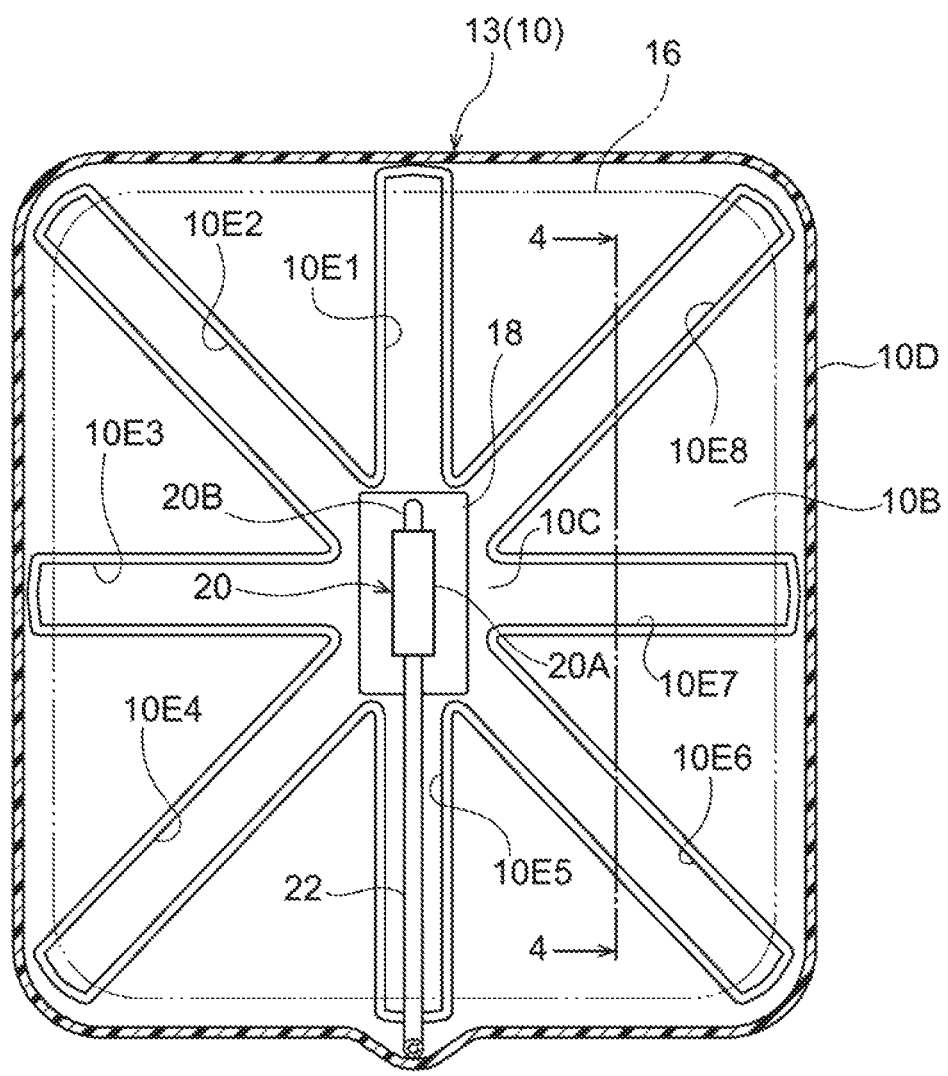
FIG. 3 is a cross-section illustrating a state sectioned along line 3-3 in FIG. 1.

Note that a pump housing recessed portion 10C is formed in a bottom portion 10B of the fuel tank 10. As illustrated in FIG. 3, the pump housing recessed portion 10C is formed at a center portion of the fuel tank 10 in plan view. A filter 18 and a fuel pump 20 are disposed inside the pump housing recessed portion 10C.

The filter 18 is formed in a substantially rectangular shape in plan view, and a supply pipe 20B of the fuel pump 20 is attached to the filter 18.

The fuel pump 20 is disposed on the filter 18, and is configured including a pump main body 20A and the supply pipe 20B. As illustrated in FIG. 5, the supply pipe 20B links the pump main body 20A and the filter 18 together, and fuel GS from which foreign matter has been removed is supplied to the pump main body 20A through the filter 18. A fluid feed pipe 22 is connected to the pump main body 20A, and fuel GS that has been supplied to the pump main body 20A is fed to an engine, not illustrated in the drawings, through the fluid feed pipe 22.

The fluid feed pipe 22 is connected at the opposite side of the pump main body 20A to the supply pipe 20B. The fluid feed pipe 22 is installed further downward than the bottom portion 10B, and extends from the pump main body 20A toward a side wall 10D of the fuel tank 10. The fluid feed pipe 22 is then bent upward along the side wall 10D. Note that the tank configuration body 13 configuring the side wall 10D in the vicinity of the fluid feed pipe 22 bulges further to the outside than the tank configuration body 11, and a gap is provided between the tank configuration body 11 and the tank configuration body 13. The fluid feed pipe 22 extends through this gap to the outside of the fuel tank 10, and is connected to the engine, not illustrated in the drawings. Note that the gap between the tank configuration body 11 and the tank configuration body 13 is sealed by a sealing material, not illustrated in the drawings, and configured such that fuel GS and vaporized fuel inside the fuel tank 10 does not leak out.

As illustrated in FIG. 3, plural fuel flow paths 10E1 to 10E8 are formed in the bottom portion 10B of the fuel tank 10. The fuel flow paths 10E1 to 10E8 are each formed in a groove shape with one end side in communication with the pump housing recessed portion 10C. Another end side of the fuel flow paths 10E1 to 10E8 is positioned in the vicinity of the side wall 10D of the fuel tank 10. Note that when there is no distinction between each of the fuel flow paths in the below explanation, they are referred to as fuel flow paths 10E.

Note that in the present exemplary embodiment, eight fuel flow paths 10E are formed in a radiating shape about the pump housing recessed portion 10C. The first fuel flow path 10E1 extends from the pump housing recessed portion 10C to the vicinity of the side wall 10D at the opposite side to the fluid feed pipe 22. The second fuel flow path 10E2 is formed in a position rotated 45° counterclockwise about the pump housing recessed portion 10C with respect to the first fuel flow path 10E1 in plan view.

The third fuel flow path 10E3 is formed in a position rotated 45° counterclockwise about the pump housing recessed portion 10C with respect to the second fuel flow path 10E2 in plan view. The fourth fuel flow path 10E4 is thrilled in a position rotated 45° counterclockwise about the pump housing recessed portion 10C with respect to the third fuel flow path 10E3 in plan view.

The fifth fuel flow path 10E5 is formed in a position rotated 45° counterclockwise about the pump housing recessed portion 10C with respect to the fourth fuel flow path 10E4 in plan view, and is formed in substantially a straight line with the first fuel flow path 10E1. The sixth fuel flow path 10E6 is formed in a position rotated 45° counterclockwise about the pump housing recessed portion 10C with respect to the fifth fuel flow path 10E5 in plan view, and is formed in substantially a straight line with the second fuel flow path 10E2.

The seventh fuel flow path 10E7 is formed in a position rotated 45° counterclockwise about the pump housing recessed portion 10C with respect to the sixth fuel flow path 10E6 in plan view, and is formed in substantially a straight line with the third fuel flow path 10E3. The eighth fuel flow path 10E8 is formed in a position rotated 45° counterclockwise about the pump housing recessed portion 10C with respect to the seventh fuel flow path 10E7 in plan view, and is formed in substantially a straight line with the fourth fuel flow path 10E4.

Figure 4:
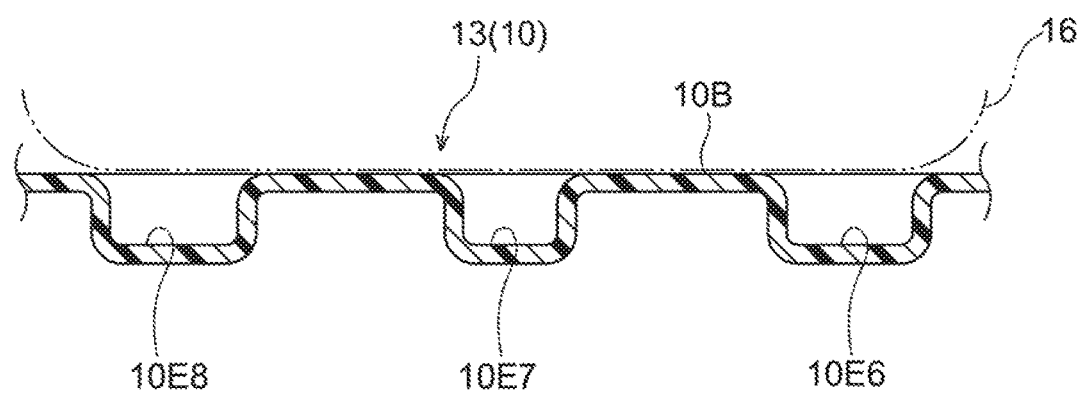
FIG. 4 is a cross-section illustrating a state sectioned along line 4-4 in FIG. 3.

The eight fuel flow paths 10E are formed as described above, and the bottom portion 10B of the fuel tank 10 is partitioned into eight by the fuel flow paths 10E. The eight fuel flow paths IDE are each formed with substantially the same groove width, and, as illustrated in FIG. 4, are formed with a groove width such that the bag shaped member 16 does not enter the fuel flow paths 10E when the bag shaped member 16 has expanded. In other words, the bag shaped member 16 is limited from expanding by the bottom portion 10B positioned between adjacent fuel flow paths 10E.

As illustrated in FIG. 1, FIG. 2, and FIG. 5, the fuel flow paths 10E are each sloped downward (in a direction away from the ceiling portion 10A) on progression from the side wall 10D toward the pump housing recessed portion 10C of the Mel tank 10. The groove depth of the fuel flow paths 10E with respect to the bottom portion 10B of the fuel tank 10 is thereby shallower in the vicinity of the side wall 10D and deeper at the pump housing recessed portion 10C.

The depth of the prunp housing recessed portion 10C is formed deeper than the height of the fuel pump 20. In the present exemplary embodiment, the depth of the pump housing recessed portion 10C is formed deeper than the height of the fuel pump 20 including the thickness of the filter 18. An upper end portion of the pump main body 20A is thereby positioned further downward than the bottom portion 10B of the fuel tank 10.

Operation and Advantageous Effects

Explanation follows regarding operation and advantageous effects of the fuel tank structure according to the present exemplary embodiment.

In the present exemplary embodiment, the bag shaped member 16 is caused to expand or contract according to the fluid surface height of the fuel GS stored in the fuel tank 10, thereby maintaining the contact state between the bag shaped member 16 and the fluid surface of the fuel GS. This enables the fluid surface of the fuel GS to be covered by the bag shaped member 16, regardless of the fluid surface height of the fuel GS. This enables the occurrence of vaporized fuel to be suppressed.

In the present exemplary embodiment, the pump housing recessed portion 10C is formed in the bottom portion 10B of the fuel tank 10, and the fuel pump 20 is disposed in the pump housing recessed portion 10C. This enables interference between the fuel pump 20 and the bag shaped member 16 to be suppressed, even in cases in which the fuel pump 20 is disposed inside the fuel tank 10. Since the fuel pump 20 is not disposed inside the tiller pipe 12, the fuel pump 20 does not hinder the fuel GS from flowing through the filler pipe 12, such as during refueling. Namely, the fuel GS can be smoothly injected through the filler pipe 12 into the fuel tank 10, enabling the fuel GS injection performance to be secured.

In configurations in which the fuel pump 20 is disposed inside the filler pipe 12, the fuel pump 20 is positioned further upward than a suction port of the supply pipe 20B, such that negative pressure when fuel GS is being sucked up is increased and the fuel GS decreases in pressure, sometimes causing gas bubbles to occur. In contrast thereto, in the present exemplary embodiment, the fuel pump 20 is disposed in the pump housing recessed portion this being the lowest portion inside the fuel tank 10, such that negative pressure when the fuel GS is being sucked in is minimal, and enabling the occurrence of gas bubbles in the fuel GS to be suppressed.

In the present exemplary embodiment, the upper end portion of the pump main body 20A is positioned further downward than the bottom portion 10B of the fuel tank 10. Thus, as illustrated in FIG. 2, even in a state in which the bag shaped member 16 has expanded and is in contact with the bottom portion 10B of the fuel tank 10, the bag shaped member 16 does not hit the fuel pump 20. This enables damage to the bag shaped member 16 due to contact between the bag shaped member 16 and the fuel pump 20 to be avoided, and enables the durability performance of the bag shaped member 16 to be secured.

In the present exemplary embodiment, the fuel flow paths 10E each extend in a groove shape from the pump housing recessed portion 10C, thereby enabling fuel GS to be supplied from the fuel flow paths 10E to the fuel pump 20, even in a state in which the bag shaped member 16 has expanded and is in contact with the bottom portion 10B of the fuel tank 10. Namely, the fuel GS supply performance can be secured. In this manner, the fuel GS injection performance and supply performance can be secured, while suppressing the occurrence of vaporized fuel.

In particular, in the present exemplary embodiment, as illustrated in FIG. 3, the fuel flow paths 10E are formed in a radiating shape about the pump housing recessed portion 10C, and the fuel flow paths 10E extend to the vicinity of the side wall 10D of the fuel tank 10. This enables fuel GS to smoothly flow through the fuel flow paths 10E toward the pump housing recessed portion 10C, even in cases in which there is a small amount of fuel GS inside the fuel tank 10. As illustrated by the double-dotted dashed line L in FIG. 2, even in cases in which the vehicle body tilts and so on, and the fluid surface of the fuel GS is sloped with respect to the fuel tank 10, the fuel GS can smoothly flow through the fuel flow paths 10E to the pump housing recessed portion 10C without being impeded by the bag shaped member 16. This enables the fuel GS supply performance to be improved in cases in which there is a small amount of fuel GS inside the fuel tank 10.

In the present exemplary embodiment, the fuel flow paths 10E are sloped, thereby enabling the fuel GS inside the fuel flow paths 10E to be effectively collected in the pump housing recessed portion 10C, compared to configurations in which the fuel flow paths 10E are not sloped.

In the present exemplary embodiment, as illustrated in FIG. 5, the fluid feed pipe that links the fuel pump 20 and the engine together is installed further downward than the bottom portion 10B of the fuel tank 10. This enables interference between the bag shaped member 16 and the fluid feed pipe 22 to be suppressed. Moreover, there is no need to separately secure a space in order to install the fluid feed pipe 22, enabling a saving in space to be achieved.

An exemplary embodiment of the present invention has been explained above; however, the present invention is not limited to the above configuration, and obviously various embodiments other than the above configuration may be implemented within a range not departing from the spirit thereof. For example, in the present exemplary embodiment, the upper end portion of the pump main body 20A is positioned further downward than the bottom portion 10B of the fuel tank 10; however, the present invention is not limited thereto. Namely, even in cases in which the upper end portion of the pump main body 20A is positioned further upward than the bottom portion 10B, as long as the configuration is not one in which the bag shaped member 16 is worn by interference between the bag shaped member 16 and the pump main body 20A, similar advantageous effects to those in the present exemplary embodiment can be obtained.

In the present exemplary embodiment, eight fuel flow paths 10E are formed; however, configuration is not limited thereto, and the number of fuel flow paths 10E is not specified. There is also no limitation to a configuration in which the fuel flow paths 10E are formed in a radiating shape, and, for example, a configuration may be applied in which plural fuel flow paths 10E are formed from the pump housing recessed portion 10C at uneven spacings.

It is preferable that the pump housing recessed portion 10C is formed to the center portion of the fuel tank 10 in plan view, from the perspective of effectively supplying fuel GS to the fuel pump 20; however, there is no particular limitation to the position where the pump housing recessed portion 10C is formed. For example, the pump housing recessed portion 10C may be formed in the vicinity of the side wall to of the fuel tank 10.

In the present exemplary embodiment the fuel flow paths 10E are caused to slope; however, configuration is not limited thereto. For example, a configuration may be applied formed with fuel flow paths that are substantially parallel to the bottom portion 10B of the fuel tank 10.

What is claimed is:

1. A fuel tank structure comprising:
   a fuel tank that is mounted to an automobile and that is configured to store fuel;
   a bag shaped member that is fixed to a ceiling portion inside the fuel tank, and that is configured to maintain a contact state with the fuel by expanding or contracting according to a fluid surface height of fuel stored inside the fuel tank;
   a pump housing recessed portion that is formed to a bottom portion of the fuel tank with a fuel pump disposed therein;
   a fuel flow path that is in communication with the pump housing recessed portion and that extends from the pump housing recessed portion in a groove shape,
   wherein:
   the pump housing recessed portion is formed deeper than a height of the fuel pump and is formed at a center portion of the fuel tank in plan view; and
   the fuel flow path is formed in a radiating shape running from the pump housing recessed portion toward a side wall of the fuel tank.

2. The fuel tank structure of claim 1, wherein the fuel flow path is sloped in a direction away from the ceiling portion on progression from a side wall of the fuel tank toward the pump housing recessed portion.

* * * * *